United States Patent
Uçar et al.

(10) Patent No.: US 12,014,630 B2
(45) Date of Patent: Jun. 18, 2024

(54) SYSTEMS AND METHODS FOR ASSISTING A MANEUVER OF A MOVING OBJECT

(71) Applicant: Toyota Motor Engineering & Manufacturing North America, Inc., Plano, TX (US)

(72) Inventors: Seyhan Uçar, Mountain View, CA (US); Baik Hoh, Campbell, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 185 days.

(21) Appl. No.: 16/807,617

(22) Filed: Mar. 3, 2020

(65) Prior Publication Data

US 2021/0280057 A1 Sep. 9, 2021

(51) Int. Cl.
| | | |
|---|---|---|
| *G05D 1/02* | (2020.01) | |
| *B64C 39/02* | (2023.01) | |
| *G05D 1/00* | (2006.01) | |
| *G08G 1/00* | (2006.01) | |
| *G08G 1/07* | (2006.01) | |

(Continued)

(52) U.S. Cl.
CPC ............ *G08G 1/09* (2013.01); *B64C 39/024* (2013.01); *G08G 1/07* (2013.01); *G08G 1/20* (2013.01); *B64U 2101/00* (2023.01)

(58) Field of Classification Search
None
See application file for complete search history.

(56) References Cited

U.S. PATENT DOCUMENTS

| | | |
|---|---|---|
| 9,371,133 B2 | 6/2016 | Mays |
| 9,434,473 B2 | 9/2016 | Peeters et al. |

(Continued)

FOREIGN PATENT DOCUMENTS

| | | |
|---|---|---|
| CN | 108922214 A | 11/2018 |
| KR | 20160137442 A | 11/2016 |

(Continued)

OTHER PUBLICATIONS

See Espacenet Translation of KR 101774313 B1, Lee, 2017, pp. 1-7 (Year: 2017).*

(Continued)

*Primary Examiner* — Adam D Tissot
*Assistant Examiner* — Michael T Silva
(74) *Attorney, Agent, or Firm* — Dinsmore & Shohl LLP

(57) ABSTRACT

A system for assisting a maneuver of a moving object is provided. The system includes a plurality of unmanned aerial vehicles, and a computing device comprising a controller configured to: identify a maneuver location of the moving object based on location information associated with the moving object, determine one or more unmanned aerial vehicles among the plurality of unmanned aerial vehicles based on a proximity of the maneuver location and the plurality of unmanned aerial vehicles, dispatch the one or more unmanned aerial vehicles to the maneuver location, and transmit an instruction signal to the one or more unmanned aerial vehicles, wherein the instruction signal causes the one or more unmanned aerial vehicles to generate an indication configured to assist one or more vehicles approaching the maneuver location.

20 Claims, 12 Drawing Sheets

(51) Int. Cl.
  *G08G 1/09* (2006.01)
  *G08G 1/0955* (2006.01)
  *B64U 101/00* (2023.01)

(56) References Cited

U.S. PATENT DOCUMENTS

| | | | |
|---|---|---|---|
| 9,471,059 | B1 | 10/2016 | Wilkins |
| 9,535,423 | B1 | 1/2017 | Debreczeni |
| 9,847,032 | B2 | 12/2017 | Postrel |
| 10,223,753 | B1 | 3/2019 | Marlow et al. |
| 10,380,694 | B1 | 8/2019 | Grant et al. |
| 10,891,856 | B1 * | 1/2021 | Graham ................. H04L 67/12 |
| 2017/0011633 | A1 | 1/2017 | Boegel |
| 2017/0092109 | A1 * | 3/2017 | Trundle ............... G05D 1/0011 |
| 2017/0301234 | A1 * | 10/2017 | Park ........................ G01S 19/14 |
| 2018/0075759 | A1 * | 3/2018 | Kim ................ G08G 1/096827 |
| 2018/0089997 | A1 * | 3/2018 | Ho ......................... G08G 1/164 |
| 2018/0174448 | A1 * | 6/2018 | Gomez Gutierrez .. G08G 1/095 |
| 2019/0019416 | A1 * | 1/2019 | Perko .................. G05D 1/0011 |
| 2019/0051169 | A1 * | 2/2019 | Gomez Gutierrez .. G08G 1/087 |
| 2019/0066503 | A1 * | 2/2019 | Li .......................... G08G 1/012 |
| 2019/0227555 | A1 * | 7/2019 | Sun ........................ G08G 1/005 |
| 2019/0263401 | A1 * | 8/2019 | Yoo ........................ G08G 1/167 |
| 2020/0020227 | A1 * | 1/2020 | Ran ........................ G08G 1/075 |
| 2020/0057453 | A1 * | 2/2020 | Laws ....................... G08G 1/22 |
| 2020/0130827 | A1 * | 4/2020 | Kozak ................. G08G 5/0069 |
| 2020/0201353 | A1 * | 6/2020 | Martin ................ G05D 1/0276 |
| 2021/0034060 | A1 * | 2/2021 | Patnaik .............. B62D 15/0285 |
| 2021/0256845 | A1 * | 8/2021 | Sharon ................ G08G 1/0112 |

FOREIGN PATENT DOCUMENTS

| | | | |
|---|---|---|---|
| KR | 101774313 | B1 * | 9/2017 |
| KR | 101871826 | B1 * | 6/2018 |
| WO | 2014080388 | A2 | 5/2014 |

OTHER PUBLICATIONS

See Espacenet Translation of KR 101871826 B1, Cho, 2018, pp. 1-11 (Year: 2018).*

* cited by examiner

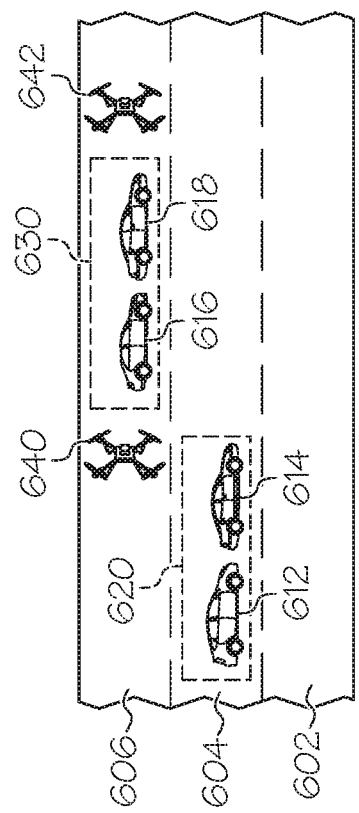
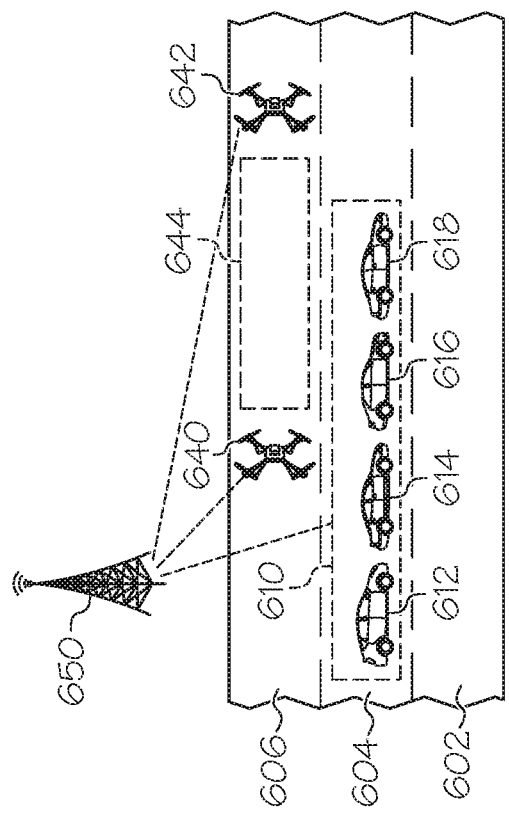

SYSTEMS AND METHODS FOR ASSISTING A MANEUVER OF A MOVING OBJECT

TECHNICAL FIELD

The present specification generally relates to systems and methods for assisting a maneuver of a moving object and, more specifically, to systems and methods for assisting a maneuver of a moving object using one or more unmanned aerial vehicles.

BACKGROUND

One or more large entities, such as trucks, tractor-trailer combinations, or the like maneuver on a street. Maneuvering of such large entities, e.g., turning on the road, may present challenges due to the size of such large entities, particularly when such large entities are maneuvering in the present of other entities or other large entities.

Accordingly, a need exists for systems for assisting a maneuver of a moving object on the roads.

SUMMARY

In one embodiment, a system for assisting a maneuver of a moving object is provided. The system includes a plurality of unmanned aerial vehicles, and a computing device comprising a controller configured to: identify a maneuver location of the moving object based on location information associated with the moving object, determine one or more unmanned aerial vehicles among the plurality of unmanned aerial vehicles based on a proximity of the maneuver location and the plurality of unmanned aerial vehicles, dispatch the one or more unmanned aerial vehicles to the maneuver location, and transmit an instruction signal to the one or more unmanned aerial vehicles, wherein the instruction signal causes the one or more unmanned aerial vehicles to generate an indication configured to assist one or more vehicles approaching the maneuver location.

In another embodiment, a server for assisting a maneuver of a moving object is provided. The server includes a controller configured to: identify a maneuver location of the moving object based on location information associated with the moving object; determine one or more unmanned aerial vehicles among a plurality of unmanned aerial vehicles based on a proximity of the maneuver location and the plurality of unmanned aerial vehicles; dispatch the one or more unmanned aerial vehicles to the maneuver location; and transmit an instruction signal to the one or more unmanned aerial vehicles, wherein the instruction signal causes the one or more unmanned aerial vehicles to generate an indication configured to assist one or more vehicles approaching the maneuver location.

In yet another embodiment, a method for assisting a maneuver of a moving object is provided. The method includes identifying a maneuver location of the moving object based on location information associated with the moving object, determining one or more unmanned aerial vehicles among a plurality of unmanned aerial vehicles based on a proximity of the maneuver location and the plurality of unmanned aerial vehicles, dispatching the one or more unmanned aerial vehicles to the maneuver location, and transmitting an instruction signal to the one or more unmanned aerial vehicles, wherein the instruction signal causes the one or more unmanned aerial vehicles to generate an indication configured to assist one or more vehicles approaching the maneuver location.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 6A depicts a system for assisting a splitting of a platoon of vehicles, according to another embodiment shown and described herein;

FIG. 6B depicts a system for assisting a splitting of a platoon of vehicles, according to another embodiment shown and described herein;

DETAILED DESCRIPTION

Figure 1A:
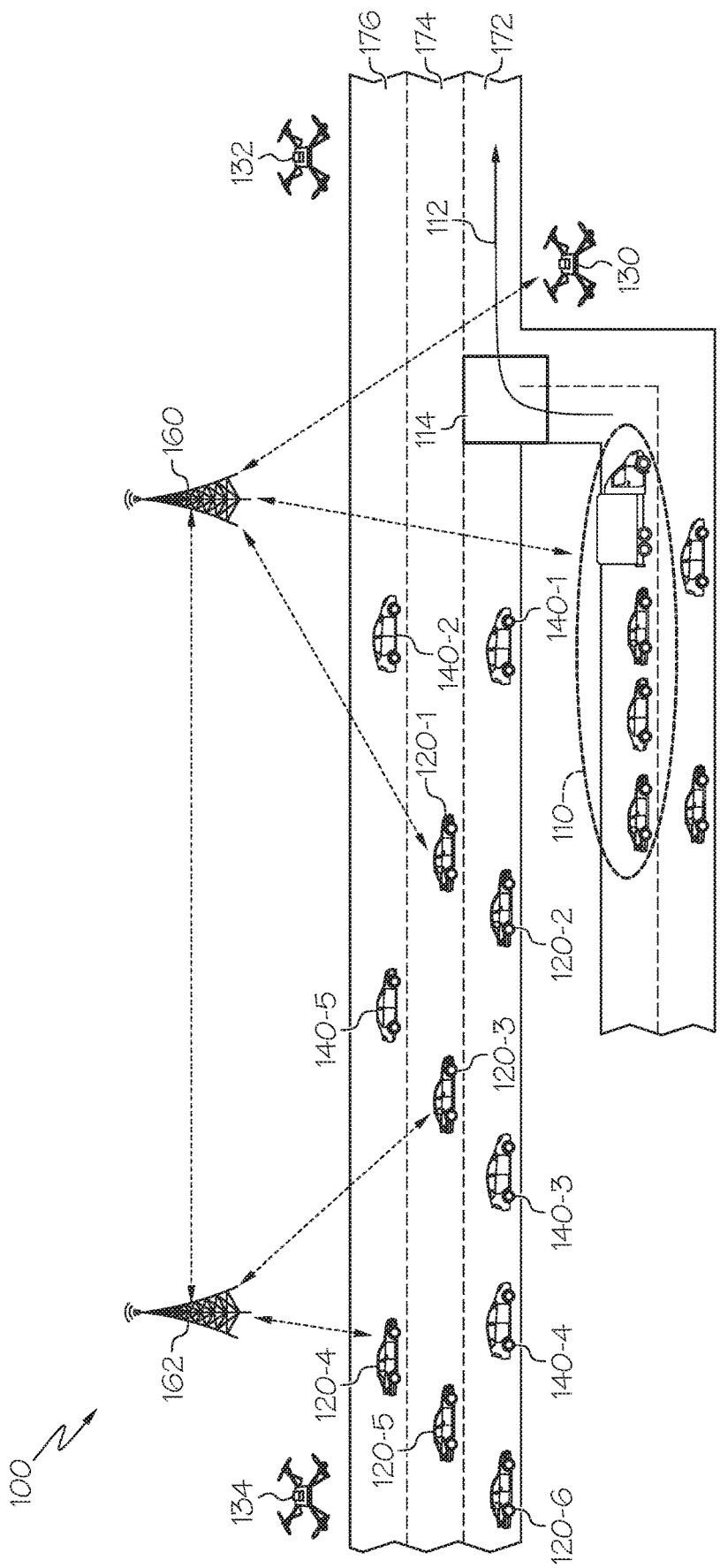
FIG. 1A depicts a system for assisting a maneuver of a moving object, according to one or more embodiments shown and described herein.
Figure 1B:
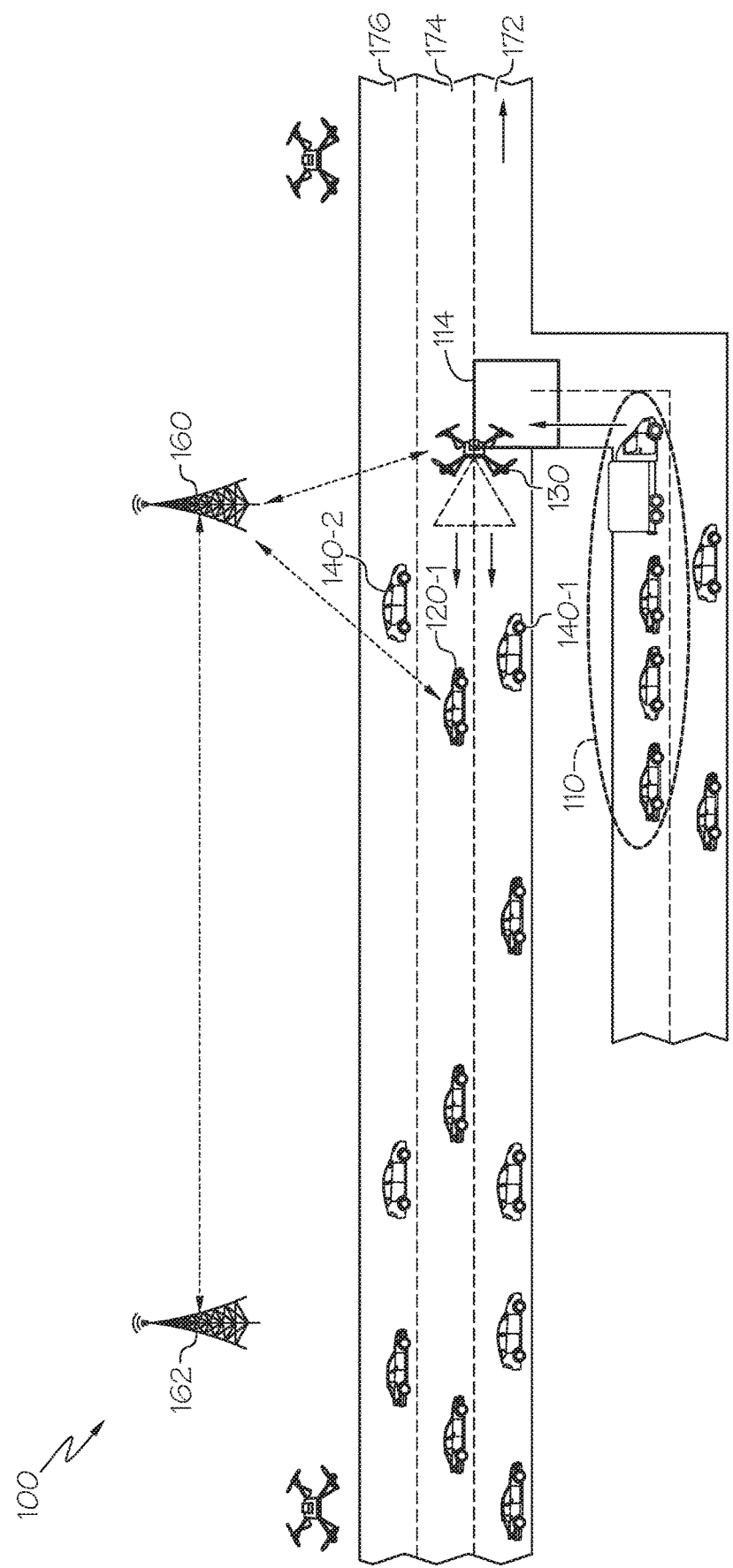
FIG. 1B depicts a system for assisting a maneuver of a moving object, according to one or more embodiments shown and described herein.
Figure 1C:
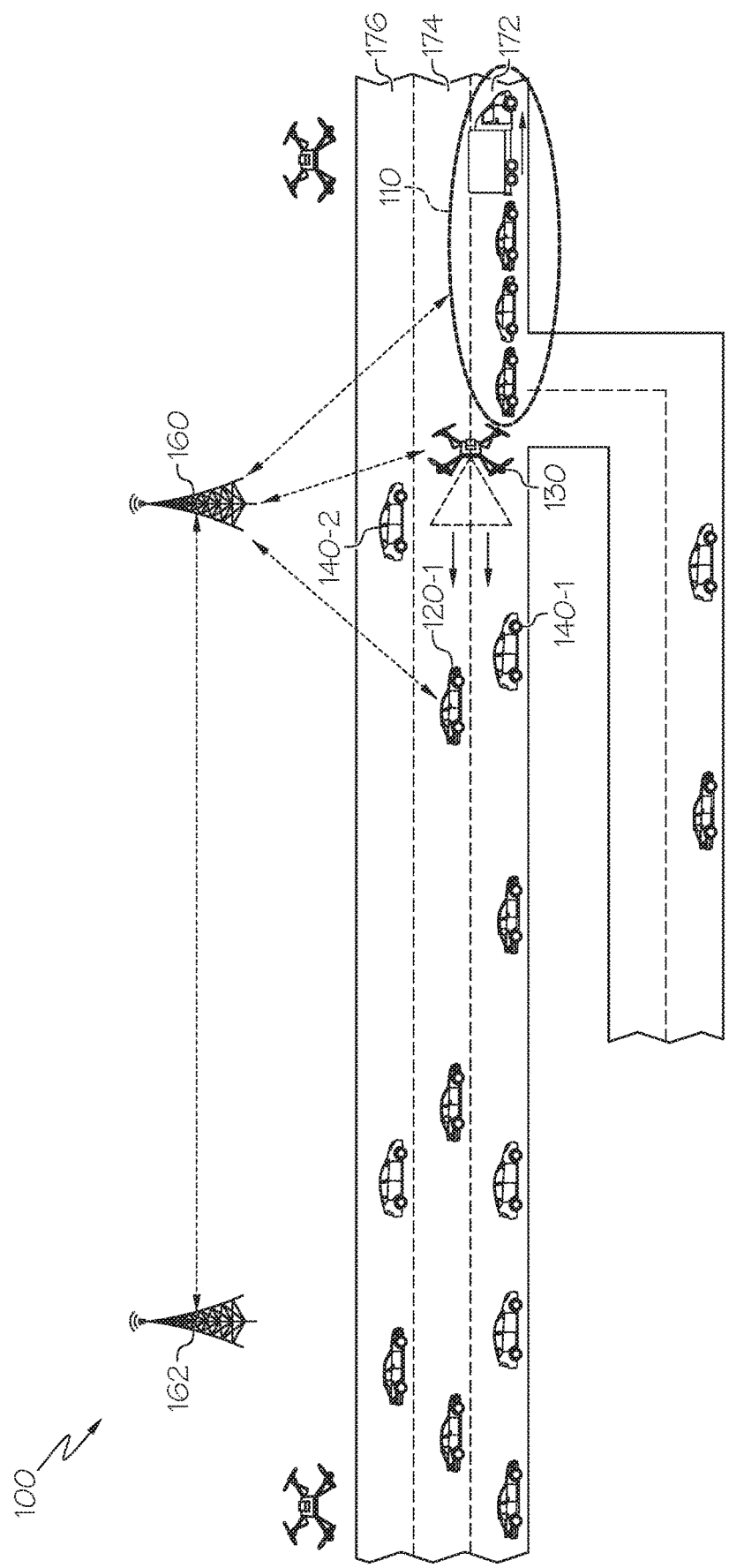
FIG. 1C depicts a system for assisting a maneuver of a moving object, according to one or more embodiments shown and described herein

The embodiments disclosed herein include methods and systems for assisting a maneuver of a moving object. Referring generally to FIGS. 1A through 1C, the system identifies a maneuver location 114 of a moving object 110 based on location information associated with the moving object 110, determine one or more unmanned aerial vehicles 130 among the plurality of unmanned aerial vehicles 130, 132, 134 based on a proximity of the maneuver location 114 and the plurality of unmanned aerial vehicles 130, 132, 134; dispatch the one or more unmanned aerial vehicles 130 to the maneuver location 114; and transmit an instruction signal to the one or more unmanned aerial vehicles 130. In response to the instruction signal, the one or more unmanned aerial vehicles 130 generates an indication configured to assist one or more vehicles 120-1, 140-1, 140-2 approaching the maneuver location 114.

The present disclosure addresses the maneuvering of large, long or interdependent entities by leveraging unmanned aerial vehicles as a new layer of public infrastructure. The system according to the present disclosure not only helps entities to perform maneuvers but also directs ongoing traffic around the maneuvers. The system computes the maneuver locations based on available information by using origin or destination and the route of entities. For example, the system may determine the location of a U-turn of an entity along the route of the entity. The system initiates drone-as-a-maneuver assistance before entities reach maneuver locations. The system explores nearby and available unmanned aerial vehicles and navigates the unmanned aerial vehicles to maneuver locations. The present system assists the entities with executing smooth maneuvers, and helps the driver to explore the blind spots of large or long entities. The system escorts vehicles on-demand and forewarns the neighboring traffic about potential risk by directing the traffic through lights output by unmanned aerial vehicles.

FIG. 1A depicts a system for assisting a maneuver of a moving object, according to one or more embodiments shown and described herein. In embodiments, the system 100 includes a moving object 110, one or more connected vehicles 120 such as connected vehicles 120-1, 120-2, 120-3, 120-4, 120-5, 120-6, one or more unmanned aerial vehicles 130, 132, 134, one or more non-connected vehicles 140 such as non-connected vehicles 140-1, 140-2, 140-3, 140-4, 140-5, and one or more servers 160 and 162. The details of the moving object 110, the connected vehicle 120, the unmanned aerial vehicle 130, and the server 160 will be described below with reference to FIG. 2.

Each of the moving object 110, the one or more connected vehicles 120, the one or more non-connected vehicles 140 may be an automobile or any other passenger or non-passenger vehicle such as, for example, a terrestrial, aquatic, and/or airborne vehicle including, but not limited, a bus, a train, a scooter, and a bicycle. In some embodiments, each of the moving object 110 and the one or more connected vehicles 120 may be an autonomous vehicle that navigates its environment with limited human input or without human input. Each of the moving object 110 and the one or more connected vehicles 120 may be equipped with internet access and may share data with other devices both inside and outside the moving object 110 or the connected vehicles 120. Each of the moving object 110 and the one or more connected vehicles 120 may communicate with the server 160 or 162. Each of the moving object 110 and the one or more connected vehicles 120 may transmit its current location and/or a planned route to the server 160 or 162. The server 160 or 162 may be a remote server or an edge server such as a road side unit. The server 160 may communicate with other server such as the server 162.

In embodiments, the moving object 110 may be a large or long transportation entity, such as a truck, a semi-truck, an over-height or over weight vehicle, a vehicle with a trailer, and the like. The moving object 110 may be an entity that consists of a tractor unit with a body or a semi-trailer. In some embodiments, the moving object 110 may be interdependent transportation entities. For example, the moving object 110 may be a vehicular platoon consisting of a group of vehicles that can travel closely together as illustrated in FIG. 1A. Each vehicle may communicate with the other vehicles in the platoon. The platoon may include a lead vehicle that controls the speed and direction, and one or more following vehicles, which through matched braking and acceleration, may respond to the lead vehicle's movement. As another example, the moving object 110 may be a multi-platoon, which is an enhanced version of a platoon comprising a chain of platoons where one platoon follows another platoon.

In some embodiments, the moving object 110 may carry an unmanned aerial vehicle 130. For example, the unmanned aerial vehicle 130 may be carried in a container of the moving object 110, such as a trunk or container of the moving object 110. As another example, the unmanned aerial vehicle 130 may dock onto the top of the moving object 110. In some embodiments, the unmanned aerial vehicle 130 may independently follow the moving object 110.

The moving object 110 which is, in this example, a vehicle platoon consisting of multiple vehicles driving together, may request a maneuver (e.g., an entrance maneuver) to the server 160. For example, the moving object 110 may transmit its current location and planned route 112 to the server 160. The server 160 may identify a maneuver location 114 of the moving object 110 based on location information associated with the moving object 110. Specifically, the server 160 may identify the maneuver location 114 of the moving object 110 based on the current location and the planned route 112 of the moving object 110. In some embodiments, the maneuver location of the moving object 110 may be a dynamic maneuver location. For example, the maneuver location of the moving object 110 may be dynamically determined depending on traffic conditions such as a location of an accident, a location of a construction site, a pothole on the road, and the like.

The server 160 may determine one or more unmanned aerial vehicles among the plurality of unmanned aerial vehicles 130, 132, 134 based on a proximity of the maneuver location 114 and the plurality of unmanned aerial vehicles. In this example, the server 160 may determine the unmanned aerial vehicle 130 among the plurality of unmanned aerial vehicles 130, 132, 134 because the unmanned aerial vehicle 130 is closest to the maneuver location 114 and is available. In some embodiments, the unmanned aerial vehicle 130 may be carried by the moving object 110, and the server 160 may select the unmanned aerial vehicle carried by the moving object 110.

The server 160 may dispatch one or more unmanned aerial vehicles to the maneuver location 114 before the moving object 110 initiates maneuvering, e.g., entering into the lane 172, as illustrated in FIG. 1B. While the present embodiments illustrate an entrance maneuvering, the maneuvering may include, but is not limited to, left turns, right turns, U turns, a merging of a platoon of vehicles, a splitting of a platoon of vehicles, and the like.

The server 160 may instruct the unmanned aerial vehicle 130 to generate an indication configured to assist one or more vehicles approaching the maneuver location 114. For example, the server 160 may instruct the unmanned aerial vehicle 130 to generate a light, such as a yellow or red light toward vehicles coming toward the maneuver location 114. In this example, the connected vehicle 120-1 and the non-connected vehicle 140-1 may identify the light output by the unmanned aerial vehicle 130 and slow down or stop before the maneuver location 114 such that the moving object 110 may conduct an entrance maneuver without conflicting with the routes of the connected vehicle 120-1 or the non-connected vehicle 140-1. In some embodiments, the unmanned aerial vehicle 130 may transmit a wireless message to the connected vehicle 120-1 via vehicle-to-vehicle (V2V) communication or vehicle-to-everything (V2X) communication that the connected vehicle 120-1 needs to slow down, stop or change lanes from the lane 174 to the lane 176. The wireless message may include information such as the maneuver location 114, the time of maneuvering of the moving object 110, and the like.

By referring to FIG. 1C, the unmanned aerial vehicle 130 may assist the moving object 110 to maneuver at the maneuver location 114 by preventing other vehicles from interfering with the maneuver of the moving object 110. The unmanned aerial vehicle 130 may obtain the status of maneuvering of the moving object 110. For example, the unmanned aerial vehicle 130 may monitor the moving object 110 by using one or more imaging sensors. As another example, the unmanned aerial vehicle 130 may receive information about the status of the moving object 110 via V2V or V2X communication. Once the maneuver of the moving object 110 is completed, the unmanned aerial vehicle 130 may return to its original location.

Figure 2:
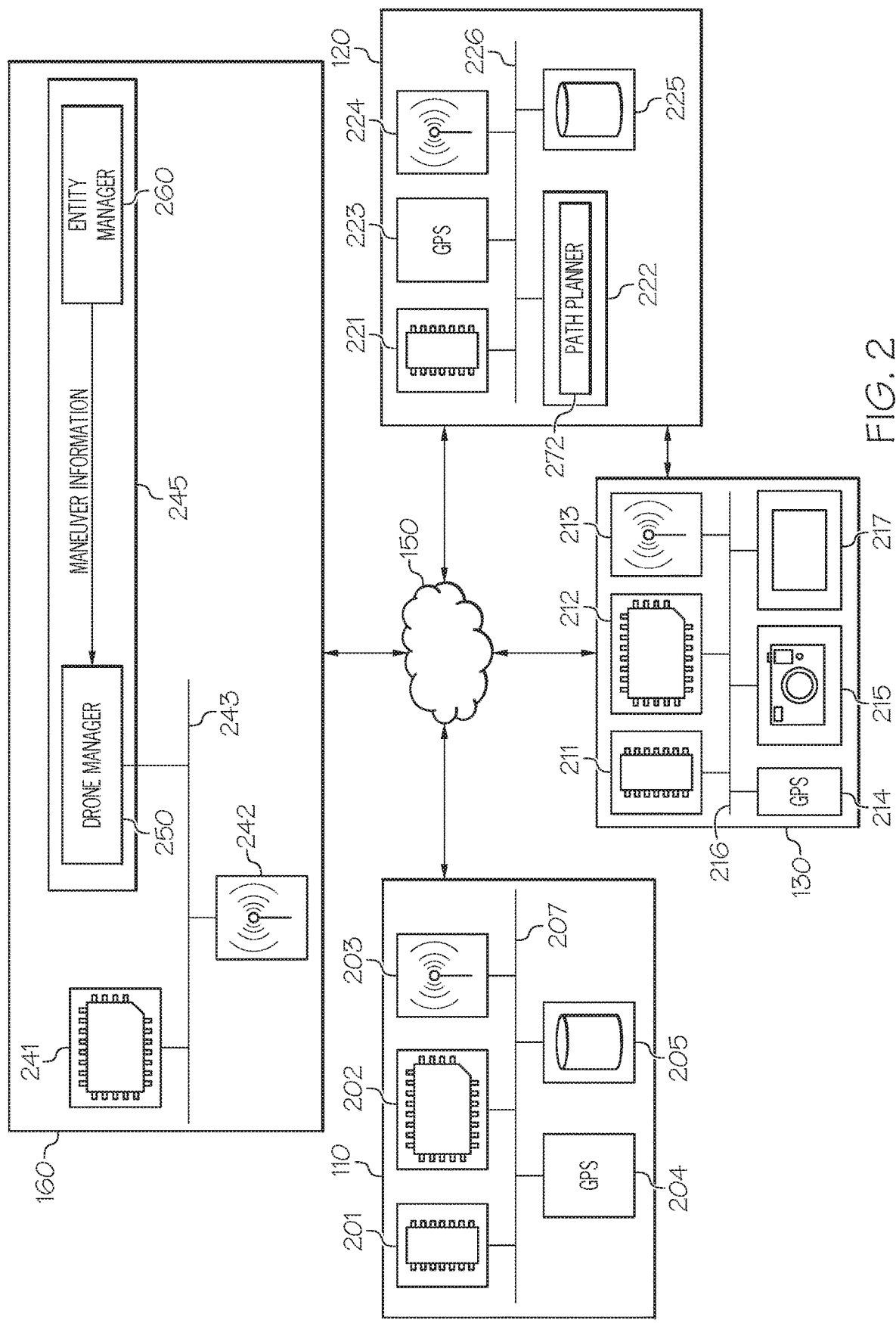
FIG. 2 depicts schematic diagrams of the system for assisting a maneuver of a moving object, according to one or more embodiments shown and described herein.

FIG. 2 depicts schematic diagrams of the system for assisting a maneuver of a moving object, according to one or more embodiments shown and described herein.

The moving object 110 includes one or more processors 201, one or more memory modules 202, a network interface hardware 203, a satellite antenna 204, one or more vehicle sensors 205, and a communication path 207.

Each of the one or more processors 201 of the moving object 110 may be any device capable of executing machine readable instructions. Accordingly, each of the one or more processors 201 may be a controller, an integrated circuit, a microchip, a computer, or any other computing device. Each of the one or more processors 201 is communicatively coupled to the other components of the moving object 110 by the communication path 207. Accordingly, the communication path 207 may communicatively couple any number of processors with one another, and allow the components coupled to the communication path 207 to operate in a distributed computing environment. Specifically, each of the components may operate as a node that may send and/or receive data.

Each of the one or more memory modules 202 of the moving object 110 is coupled to the communication path 207 and communicatively coupled to the one or more processors 201. Each of the one or more memory modules 202 may comprise RAM, ROM, flash memories, hard drives, or any device capable of storing machine readable instructions such that the machine readable instructions can be accessed and executed by the one or more processors 201. The machine readable instructions may comprise logic or algorithm(s) written in any programming language of any generation (e.g., 1GL, 2GL, 3GL, 4GL, or 5GL) such as, for example, machine language that may be directly executed by the one or more processors 201, or assembly language, object-oriented programming (OOP), scripting languages, microcode, etc., that may be compiled or assembled into machine readable instructions and stored in the one or more memory modules 202. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. The one or more memory modules 202 may include driving information of the moving object 110 including, for example, previous and current routes, destinations, and the like.

Still referring to FIG. 2, the network interface hardware 203 is coupled to the communication path 207 and communicatively coupled to the one or more processors 201. The network interface hardware 203 may be any device capable of transmitting and/or receiving data via a network. Accordingly, the network interface hardware 203 can include a communication transceiver for sending and/or receiving any wired or wireless communication. For example, the network interface hardware 203 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 203 includes hardware configured to operate in accordance with the Bluetooth wireless communication protocol. In other embodiments, the network interface hardware 203 includes hardware configured to operate in accordance with a wireless communication protocol other than Bluetooth. The network interface hardware 203 of the moving object 110 may communicate with the server 160, the one or more connected vehicle 120, or the unmanned aerial vehicle 130.

Still referring to FIG. 2, a satellite antenna 204 is coupled to the communication path 207 such that the communication path 207 communicatively couples the satellite antenna 204 to other modules of the moving object 110. The satellite antenna 204 is configured to receive signals from global positioning system satellites. Specifically, in one embodiment, the satellite antenna 204 includes one or more conductive elements that interact with electromagnetic signals transmitted by global positioning system satellites. The received signal is transformed into a data signal indicative of the location (e.g., latitude, longitude, and altitude) of the satellite antenna 204 or an object positioned near the satellite antenna 204, by the one or more processors 201. The one or more memory modules 202 may include instructions for transmitting the location received by the satellite antenna 204 to the server 160.

The moving object 110 comprises one or more vehicle sensors 205. Each of the one or more vehicle sensors 205 is coupled to the communication path 207 and communicatively coupled to the one or more processors 201. The one or more vehicle sensors 205 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. The one or more memory modules 202 may include instructions for transmitting motion data from the one or more vehicle sensors 205 to the server 160.

The unmanned aerial vehicle 130 includes one or more processors 211, one or more memory modules 212, a network interface hardware 213, a satellite antenna 214, one or more cameras 215, a communication path 216, and a display device 217. Each of the one or more processors 211 of the unmanned aerial vehicle 130 may be any device capable of executing machine readable instructions. Accordingly, each of the one or more processors 211 may be a controller, an integrated circuit, a microchip, a computer, or any other computing device. Each of the one or more processors 211 is communicatively coupled to the other components of the unmanned aerial vehicle 130 by the communication path 216.

Each of the one or more memory modules 212 of the unmanned aerial vehicle 130 is coupled to the communication path 216 and communicatively coupled to the one or more processors 211. Each of the one or more memory modules 212 may comprise RAM, ROM, flash memories, hard drives, or any device capable of storing machine readable instructions such that the machine readable instructions can be accessed and executed by the one or more processors 211.

Still referring to FIG. 2, the network interface hardware 213 is coupled to the communication path 216 and communicatively coupled to the one or more processors 211. The network interface hardware 213 may be any device capable of transmitting and/or receiving data via a network, similar to the network interface hardware 213. The network interface hardware 213 of the unmanned aerial vehicle 130 may communicate with the server 160, the moving object 110, or the one or more connected vehicles 120.

Still referring to FIG. 2, a satellite antenna 214 is coupled to the communication path 216 such that the communication path 216 communicatively couples the satellite antenna 214 to other modules of the unmanned aerial vehicle 130. The satellite antenna 214 is configured to receive signals from global positioning system satellites similar to the satellite antenna 204.

Still referring to FIG. 2, one or more cameras 215 are coupled to the communication path 216 such that the communication path 216 communicatively couples the one or more cameras 215 to other modules of the unmanned aerial vehicle 130. Each of the one or more cameras 215 may be any device having an array of sensing devices (e.g., pixels) capable of detecting radiation in an ultraviolet wavelength band, a visible light wavelength band, or an infrared wavelength band. Each of the one or more cameras 215 may have any resolution. The one or more cameras 215 may include an omni-directional camera, or a panoramic camera. In some embodiments, one or more optical components, such as a mirror, fish-eye lens, or any other type of lens may be optically coupled to at least one of the one or more cameras 215. The one or more cameras 215 may be used to capture an image of vehicles nearby, e.g., the moving object 110, the connected vehicle 120-1 and the non-connected vehicle 140-1 in FIG. 1B. The one or more memory modules 212 may include instructions for monitoring movements of vehicles nearby and generating feedback instructions based on the monitored movements.

Still referring to FIG. 2, the communication path 216 may be formed from any medium that is capable of transmitting a signal such as, for example, conductive wires, conductive traces, optical waveguides, or the like, similarly to the communication path 207. Moreover, the communication path 216 may be formed from a combination of mediums capable of transmitting signals.

Figure 5:
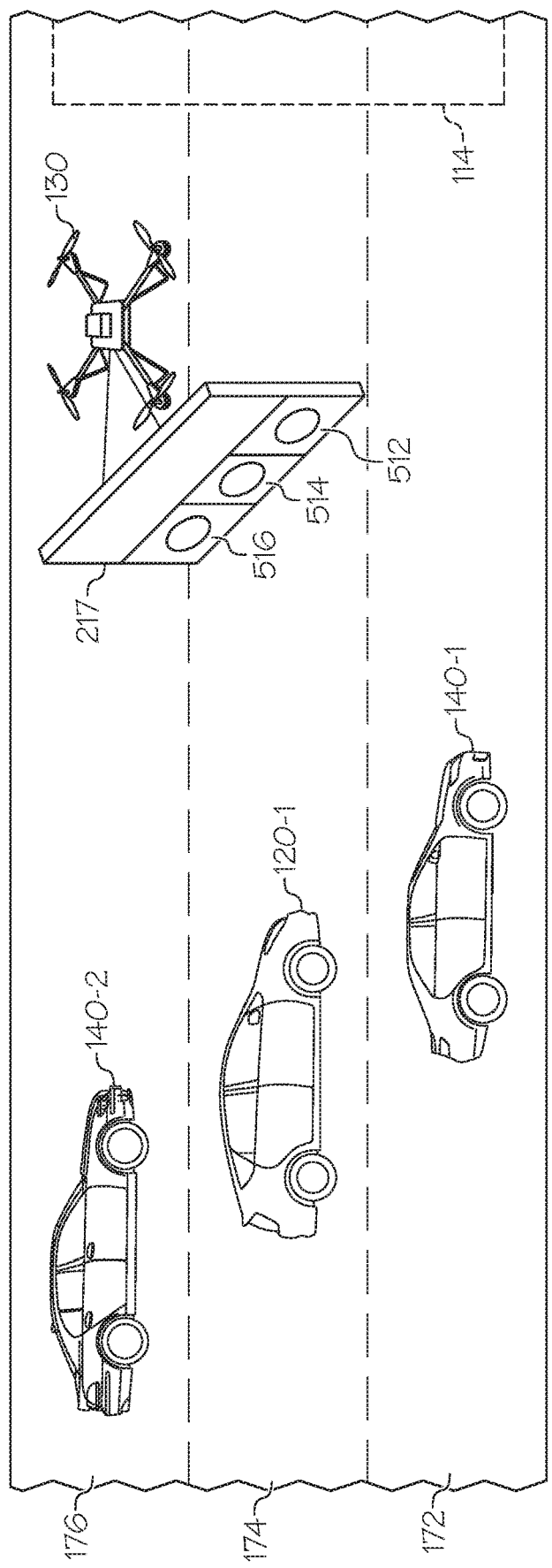
FIG. 5 depicts an unmanned aerial vehicle providing feedback to vehicles approaching the location of a maneuver of a moving object, according to one or more embodiments shown and described herein.

Still referring to FIG. 2, a display device 217 is coupled to the communication path 216 such that the communication path 216 communicatively couples the display device 217 to other modules of the unmanned aerial vehicle 130. The display device 217 may display images, videos, text, etc. which are visible to vehicles in the vicinity of the unmanned aerial vehicle 130, which will be described in detail with respect to FIG. 5.

Now referring to the connected vehicle 120, the connected vehicle 120 includes one or more processors 221, one or more memory modules 222, a satellite antenna 223, a network interface hardware 224, one or more vehicle sensors 225, and a communication path 226. The one or more processors 221 may be processors similar to the one or more processors 201 described above. The one or more memory modules 222 may be memories similar to the one or more memory modules 202 described above. The satellite antenna 223 may be a satellite antenna similar to the satellite antenna 204 described above. The network interface hardware 224 may be an interface hardware similar to the network interface hardware 203 described above. The one or more vehicle sensors 225 may be vehicle sensors similar to the one or more vehicle sensors 205 described above. The communication path 226 may be a communication path similar to the communication path 207 described above.

The one or more memory modules 222 of the connected vehicle 120 include a path planner module 272. The path planner module 272 may be a program module in the form of operating systems, application program modules, and other program modules stored in one or more memory modules 222. In some embodiments, the program module may be stored in a remote storage device that may communicate with the server 160. Such a program module may include, but is not limited to, routines, subroutines, programs, objects, components, data structures, and the like for performing specific tasks or executing specific data types as will be described below.

The path planner module 272 is configured to monitor maneuver locations and/or interpret outputs by the unmanned aerial vehicle 130 and dynamically determine a path for the connected vehicle 120. For example, by referring to FIG. 1B, the connected vehicle 120-1 may drive on the lane 174. The path planner module 272 may receive the maneuver location 114 from the server 160 as shown in FIG. 1A or may receive visual outputs by the unmanned aerial vehicle 130 as shown in FIG. 1B. Then, the path planner module 272 may generate a path that changes from the lane 174 to a lane 176 prior to approaching the maneuver location 114 such that the connected vehicle 120-1 may move around the maneuver location without interfering the maneuver of the moving object 110 at the maneuver location 114.

Now referring to the server 160 in FIG. 2, the server 160 includes one or more processors 241, one or more memory modules 245, a network interface hardware 242, and a communication path 243. The one or more processors 241 may be processors similar to the one or more processors 201 described above. The one or more memory modules 245 may be memories similar to the one or more memory modules 202 described above. The network interface hardware 242 may be an interface hardware similar to the network interface hardware 203 described above. The communication path 243 may be a communication path similar to the communication path 207 described above. The one or more processors 241 in combination of one or more memory modules 245 may operate as an electronic control unit for the server 160.

The one or more memory modules 245 of the server 160 includes a drone manager module 250 and an entity manager module 260. Each of the drone manager module 250, and the entity manager module 260 may be a program module in the form of operating systems, application program modules, and other program modules stored in one or more memory modules 245. In some embodiments, the program module may be stored in a remote storage device that may communicate with the server 160. Such a program module may include, but is not limited to, routines, subroutines, programs, objects, components, data structures, and the like for performing specific tasks or executing specific data types as will be described below.

The entity manager module 260 may receive a request for assisting a maneuver of a moving object such as a large or long transportation entity or interdependent transportation entity from the moving object. For example, the entity manager module 260 may receive route information from the mobile object such as the moving object 110, and determine one or more maneuver locations of the moving object 110 based on the route information. In some embodiments, the entity manager module 260 may receive one or more maneuver locations from the moving object 110. The entity manager module 260 may determine maneuver information about the moving object at the maneuver location based on information about the moving object. For example, the maneuver information includes an area covered by the maneuver of the moving object. The area may be varied depending on the dimension of the moving object. For example, the area covered by the maneuver of a single sedan is smaller than the area covered by the maneuver of a trailer or a vehicle platoon. The entity manager module 260 may transmit the maneuver information about the moving object to the drone manager module 250.

The drone manager module 250 may determine one or more unmanned aerial vehicles among a plurality of unmanned aerial vehicles based on a proximity of the maneuver location and the plurality of unmanned aerial vehicles. For example, the drone manager module 250 may store current locations of the unmanned aerial vehicles 130, 132, 134 illustrated in FIG. 1A. For example, the unmanned aerial vehicles 130, 132, 134 may continuously transmit their locations to the server 160 or 162. The drone manager module 250 may select the unmanned aerial vehicle 130 as a candidate for assisting the maneuver of the moving object 110 because the unmanned aerial vehicle 130 is located closest to the maneuver location 114. The drone manager module 250 may transmit an instruction to the unmanned aerial vehicle 130 to move to the maneuver location 114 and generate an indication configured to assist one or more vehicles approaching the maneuver location 114.

The drone manager module 250 may determine a number of unmanned aerial vehicles based on at least one of the maneuver information, a road geometry, road statistics such as traffic density, and any other dynamic properties. For example, the drone manager module 250 may determine that a plurality of unmanned aerial vehicles are required to assist maneuvering of a long transportation entity or a vehicle platoon. As another example, the drone manager module 250 may determine the number of required unmanned aerial vehicles based on the number of lanes. Specifically, if the road where the maneuver of a moving object is to be occurred has four lanes, the drone manager module 250 may determine that four unmanned aerial vehicles may be required to cover each lane by respective unmanned aerial vehicle.

Figure 3:
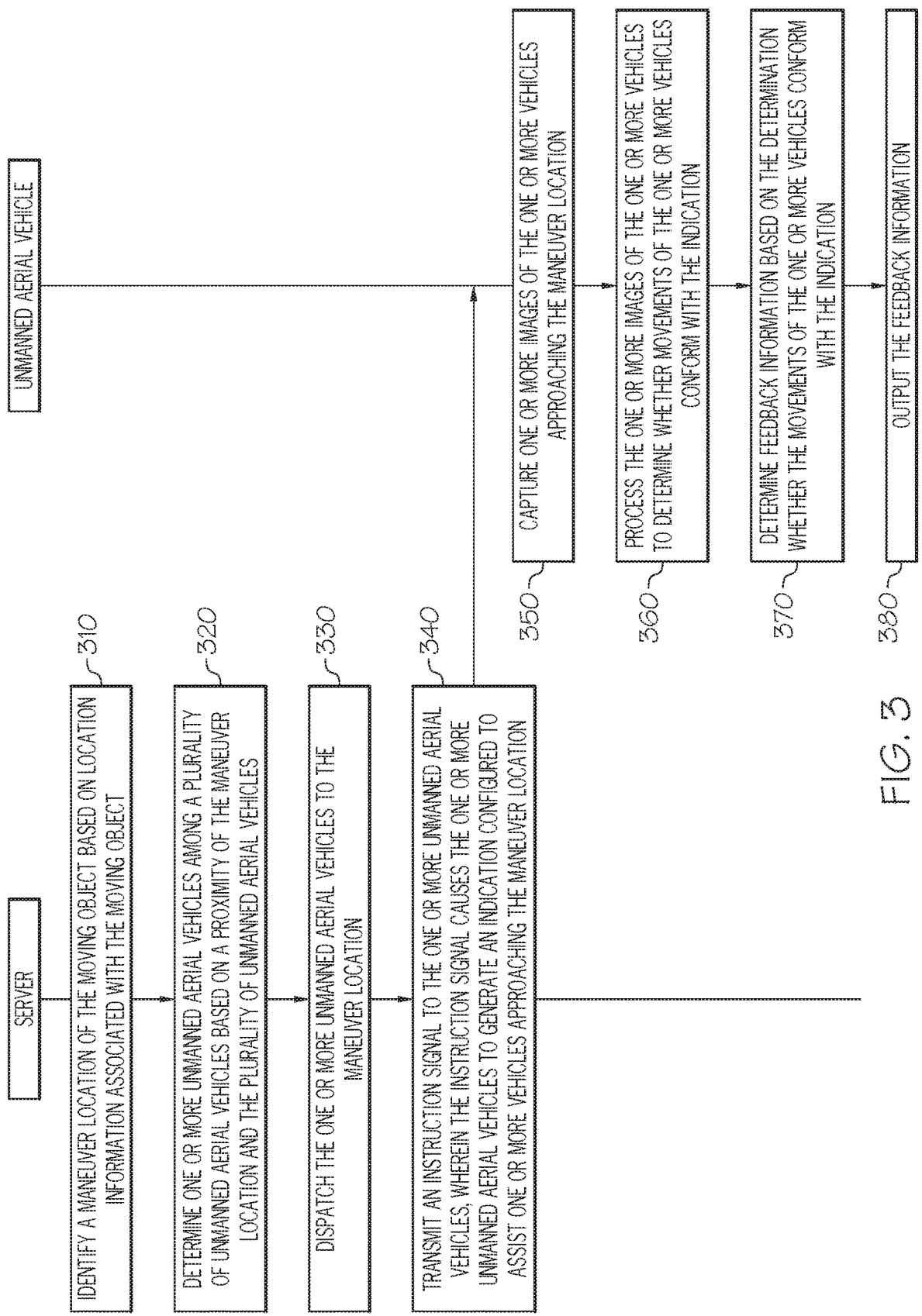
FIG. 3 depicts a flowchart for assisting a maneuver of a moving object, according to one or more embodiments shown and described herein.

FIG. 3 depicts a flowchart for assisting a maneuver of a moving object, according to one or more embodiments shown and described herein.

In step 310, a server identifies a maneuver location of a moving object based on location information associated with the moving object. In embodiments, by referring to FIG. 1A, the server 160 receives location information associated with the moving object 110. The location information may include the current position of the moving object 110 and the planned route 112 of the moving object 110. The server 160 may store a map for the current position and the planned route. Then, the server 160 may determine the maneuver location 114 based on the current position of the moving object 110, the planned route 112 of the moving object, and the map. In some embodiments, the server 160 may also determine the expected time of maneuvering of the moving object 110 at the maneuver location 114.

Figure 4:
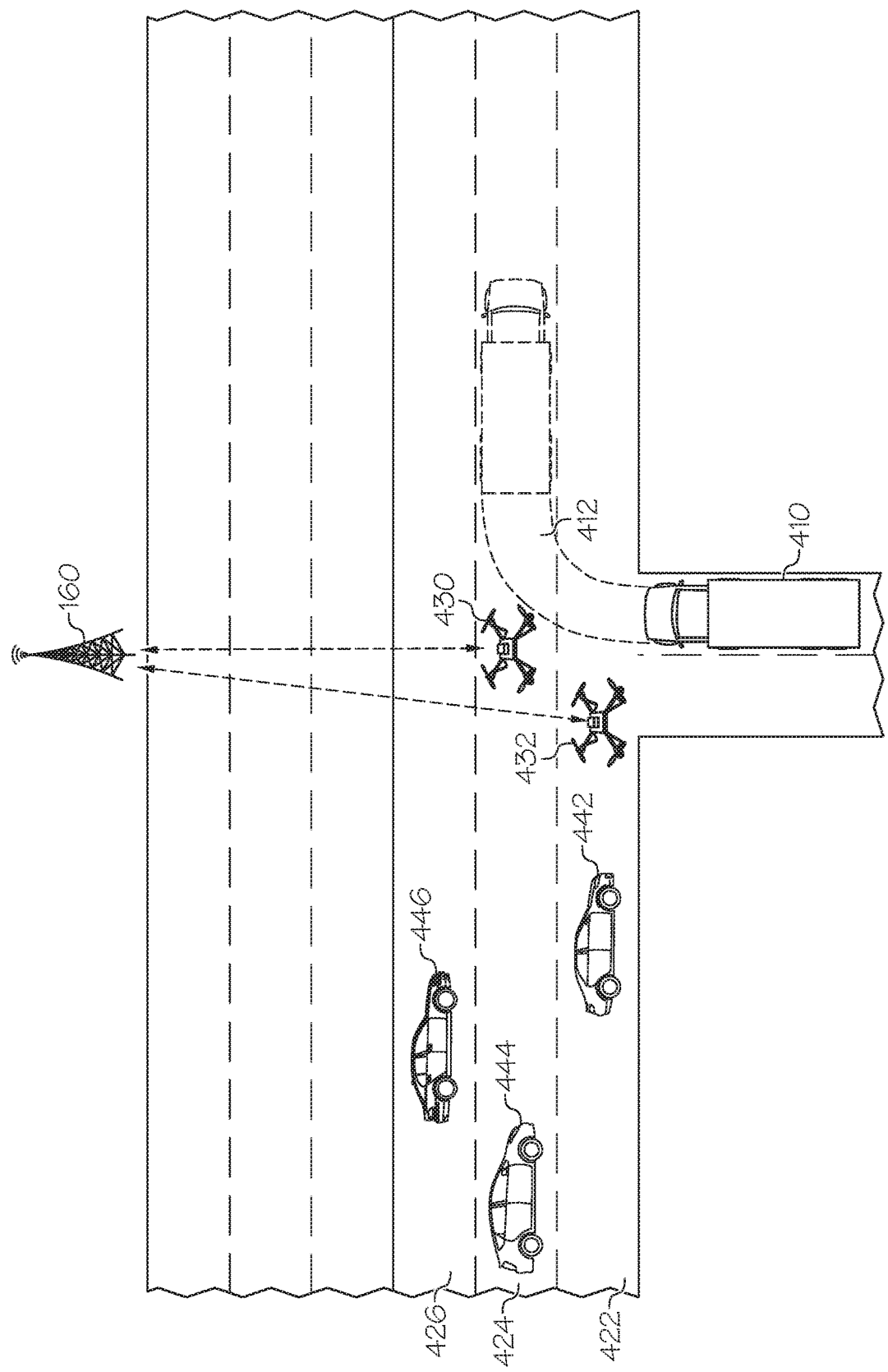
FIG. 4 depicts a system for assisting a maneuver of a long entity, according to one or more embodiments shown and described herein.

In some embodiments, the server 160 may determine an area covered by the maneuver of the moving object. For example, by referring to FIG. 4, the server 160 may receive information about the moving object 410 including the location of the moving object 410, the planned route of the moving object 410, and one or more dimensions of the moving object 410, such as the length, width, and height of the moving object 410. Based on the information about the moving object 410, the server 160 may determine an area 412 covered by the maneuver of the moving object 410, i.e., a right turn of the moving object 410.

Referring back to FIG. 3, in step 320, the server determines one or more unmanned aerial vehicles among a plurality of unmanned aerial vehicles based on a proximity of the maneuver location and the plurality of unmanned aerial vehicles. In embodiments, by referring to FIG. 1A, the server 160 may determine one or more unmanned aerial vehicles among the plurality of unmanned aerial vehicles 130, 132, 134 based on a proximity of the maneuver location 114 and the plurality of unmanned aerial vehicles 130, 132, 134. In this example, the sever 160 may determine the unmanned aerial vehicle 130 among the plurality of unmanned aerial vehicles 130, 132, 134 because the unmanned aerial vehicle 130 is closest to the maneuver location 114 and is available for assisting the maneuver of the moving object 110. In some embodiments, the server 160 may determine whether one or more unmanned aerial vehicles are available at the expected time of maneuvering of the moving objet 110 at the maneuver location 114. For example, the moving object 110 is expected to maneuver at the maneuver location 114 at 4:52 pm. Then, the server 160 may determine whether any of the unmanned aerial vehicles 130, 132, 134 are available at around 4:52 pm. Specifically, the server 160 may store schedule information for the unmanned aerial vehicles, 130, 132, 134 and identify unmanned aerial vehicles that do not have scheduled operations at around 4:52 pm.

Referring back to FIG. 3, in step 330, the server 160 dispatches the one or more unmanned aerial vehicles to the maneuver location. In embodiments, by referring to FIG. 1B, the server 160 may dispatch the unmanned aerial vehicle 130 to the maneuver location 114. In this example, the unmanned aerial vehicle 130 may hover over the maneuver location 114. As another example, the unmanned aerial vehicle 130 may locate in the vicinity of the maneuver location 114.

While FIG. 1B depicts that a single unmanned aerial vehicle is dispatched, more than one unmanned aerial vehicle may be dispatched. For example, by referring to FIG. 4, two unmanned aerial vehicles 430 and 432 may be dispatched for assisting the maneuver of the moving object 410. In this example, the moving object 410 may be a large transportation entity such as a trailer or a truck, and may simultaneously span both lanes 422 and 424 for a period of time when entering the road by turning right. The unmanned aerial vehicle 432 may be located over the lane 422 and the other unmanned aerial vehicle 430 may be located over the lane 424. The unmanned aerial vehicles 430 and 432 may guide vehicles coming toward the maneuver location of the moving object 410 to slow down, stop, or move around the area 412 covered by the maneuver of the moving object 410.

Referring back to FIG. 3, in step 340, the server 160 transmits an instruction signal to the one or more unmanned aerial vehicles, which causes the one or more unmanned aerial vehicles to generate an indication configured to assist one or more vehicles approaching the maneuver location. For example, by referring to FIG. 1B, the server 160 may instruct the unmanned aerial vehicle 130 to generate a light such as a yellow or red light toward vehicles coming toward the maneuver location 114. In this example, the connected vehicle 120-1 and the non-connected vehicle 140-1 may identify the light output by the unmanned aerial vehicle 130 and slow down or stop before the maneuver location 114 such that the moving object 110 may conduct an entrance maneuver without conflicting with the routes of the connected vehicle 120-1 or the non-connected vehicle 140-1. In some embodiments, the server 160 may instruct the unmanned aerial vehicle 130 to instruct vehicles to change lanes (e.g., change to a lane that is not affected by the maneuver of the moving object 110). For example, the unmanned aerial vehicle 130 may instruct the connected vehicle 120-1 to change its lane from the lane 174 to the lane 176 such that the connected vehicle 120-1 may move around the maneuver location 114.

In some embodiments, the unmanned aerial vehicle 130 may transmit different indications to vehicles on different lanes. For example, by referring to FIG. 5, the unmanned aerial vehicle 130 may output indications for slowing down or stopping to the non-connected vehicle 140-1. The unmanned aerial vehicle 130 may output indications for changing lanes (e.g., from the lane 174 to the lane 176) to the connected vehicle 120-1. The unmanned aerial vehicle 130 may output indications for slowing down and yielding to the connected vehicle 120-1 to the non-connected vehicle 140-2.

In some embodiments, the server 160 may instruct the unmanned aerial vehicle 130 to generate audible outputs indicating the maneuvering of the moving object 110. In some embodiments, the unmanned aerial vehicle 130 may transmit a wireless message to the connected vehicle 120 via vehicle-to-vehicle (V2V) communication or vehicle-to-everything (V2X) communication. The wireless message may include information such as the maneuver location 114, the time of maneuvering of the moving objet 110, and the like.

Referring back to FIG. 3, in step 350, the one or more unmanned aerial vehicles may capture the images of the one or more vehicles approaching the maneuver location. In embodiments, by referring to FIGS. 1B and 5, the unmanned aerial vehicles 130 may capturing images of the connected vehicle 120-1 and the non-connected vehicles 140-1 and 140-2 using one or more cameras 215. The connected vehicle 120-1 and the non-connected vehicles 140-1 and 140-2 are approaching the maneuver location 114. The connected vehicle 120-1 and the non-connected vehicles 140-1 and 140-2 may slow down, stop, or change lanes in response to guidance indications by the unmanned aerial vehicle 130. In some embodiments, the unmanned aerial vehicle 130 may include a speed detector such as a radar detector to detect the speeds of the connected vehicle 120-1 and the non-connected vehicles 140-1 and 140-2.

Referring back to FIG. 3, in step 360, the one or more unmanned aerial vehicles may process the one or more images of the one or more vehicles to determine whether movements of the one or more vehicles conform with the indication provided by the one or more unmanned aerial vehicles. In embodiments, by referring to FIG. 5, the unmanned aerial vehicle 130 may process the images of the connected vehicle 120-1 and the non-connected vehicles 140-1 and 140-2 to determine whether movements of the connected vehicle 120-1 and the non-connected vehicles 140-1 and 140-2 conform with the indications provided by the unmanned aerial vehicle 130. For example, the unmanned aerial vehicle 130 may process the images of the non-connected vehicle 140-1 to determine whether the non-connected vehicle 140-1 is slowing down or has stopped. As another example, the unmanned aerial vehicle 130 may process the images of the connected vehicle 120-1 to determine whether the connected vehicle 120-1 is changing from the lane 174. The unmanned aerial vehicle 130 may process the images of the connected vehicle 120-1 to determine whether the connected vehicle 120-1 turned on a left blinker. As another example, the unmanned aerial vehicle 130 may process the images of the non-connected vehicle 140-2 to determine whether the non-connected vehicle 140-2 slows down to yield to the connected vehicle 120-1 such that the connected vehicle 120-1 may change its lane from the lane 174 to the lane 176. In some embodiments, the unmanned aerial vehicle 130 may determine whether the movements of the connected vehicle 120-1 and the non-connected vehicles 140-1 and 140-2 conform with the indications based on readings from the speed detector of the unmanned aerial vehicle 130. While the one or more unmanned aerial vehicles may process the one or more images of the one or more vehicles to determine whether movements of the one or more vehicles conform with the indication provided by the one or more unmanned aerial vehicles, in other embodiments another entity, such as one or more of the server 160 and the server 162 may perform such processing.

Referring back to FIG. 3, in step 370, the one or more unmanned aerial vehicles may determine feedback information based on the determination whether the movement of the one or more vehicles conform with the indication. In embodiments, the feedback information includes, but is not limited to, one of a plurality of different colors, symbols or shapes, or blinking of different colors, symbols, or shapes. For example, outputting a red light may represent requesting an immediate stop. Outputting a blinking red light may represent that a distance between the corresponding vehicle and an object ahead is not suitable and the corresponding vehicle may need to slow down to increase the distance. Outputting a yellow light may represent that the corresponding vehicle is driving okay. Outputting a green light may represent the corresponding vehicle is on the safe side. Outputting a flashing green represents that a maneuver of a moving object is in process. Outputting a left or right arrow represents that the corresponding vehicle should change to the left or right lane, respectively. For example, by referring to FIG. 5, the unmanned aerial vehicle 130 may determine a red light or a blinking red light as feedback information to the non-connected vehicle 140-1 after determining that the non-connected vehicle 140-1 is very close to the maneuver location 114 or close to other moving object ahead. The unmanned aerial vehicle 130 may determine a left arrow as feedback information to the connected vehicle 120-1 after determining that the connected vehicle 120-1 is still on the lane 174 without turning on a left blinker. The unmanned aerial vehicle 130 may determine a green light as feedback information to the non-connected vehicle 140-2 after determining that the non-connected vehicle 140-2 is driving on the lane 176 at a desired speed. While the one or more unmanned aerial vehicles may determine feedback information based on the determination whether the movement of the one or more vehicles conform with the indication, in other embodiments another entity, such as one or more of the server 160 and the server 162 may perform such processing.

By referring back to FIG. 3, the one or more unmanned aerial vehicles may output the feedback information determined in step 380. In embodiments, by referring to FIG. 5, the unmanned aerial vehicle 130 may include the display device 217 configured to output the feedback information. The unmanned aerial vehicle 130 may determine the number of lanes using one or more cameras 215 and divide the display area based on the number of lanes. For example, by referring to FIG. 5, the unmanned aerial vehicle 130 may capture the images of the lanes 172, 174, 176 and determine that the number of lanes are three. Then, the unmanned aerial vehicle 130 may divide the display area into three sections, sections 512, 514, 516. The section 512 may correspond to the lane 172, the section 514 may correspond to the lane 174, and the section 516 may correspond to the lane 176. The unmanned aerial vehicle 130 may output a red light on the section 512 to provide feedback information to the non-connected vehicle 140-1 that the non-connected vehicle 140-1 needs to slow down or stop. The unmanned aerial vehicle 130 may output a left arrow on the section 514 to provide feedback information to the connected vehicle 120-1 that the connected vehicle 120-1 needs to change from the lane 174 to the lane 176. The unmanned aerial vehicle 130 may also transmit wireless signals instructing the connected vehicle 120-1 to change lanes via V2V communication in addition to or independent of the display on the section 514. The unmanned aerial vehicle 130 may output a green light on the section 516 to provide feedback information to the non-connected vehicle 140-2 that the non-connected vehicle 140-2 is driving properly.

FIGS. 6A and 6B depict unmanned aerial vehicles guiding a splitting of a platoon of vehicles, according to one or more embodiments shown and described herein. In FIG. 6A, a platoon of vehicles 610 is driving on a lane 604. The platoon of vehicles 610 includes vehicles 612, 614, 616, 618. Each of the vehicles 612, 614, 616, 618 may be either a connected vehicle or a non-connected vehicle. In this example, the platoon of vehicles 610 may need to split into two different groups and one of the groups may need to change lanes. The platoon of vehicles 610 may transmit its location along with maneuver information to the server 650. In this example, the maneuver information may include a location of maneuvering and information about splitting of the platoon of vehicles.

The server 650 may determine one or more unmanned aerial vehicles among a plurality of unmanned aerial vehicles based on a proximity of a maneuver location and the plurality of unmanned aerial vehicles. In this example, the server 650 may determine the unmanned aerial vehicles 640 and 642 and dispatch the unmanned aerial vehicles 640 and 642 to the platoon of vehicles 610. The unmanned aerial vehicles 640 and 642 may fly proximate to the platoon of the vehicles 610, and secure a space 644 for split platoon. For example, the unmanned aerial vehicles 640 and 642 are flying over the lane 606 and spaced apart to secure the space 644 to receive split vehicles. The unmanned aerial vehicles 640 and 642 may output indications such that other vehicles may not enter into the space 644.

In FIG. 6B, the platoon of vehicles 610 are split into two platoons of vehicles: a first platoon of vehicles 620 and a second platoon of vehicles 630. The first platoon of vehicles 620 includes the vehicles 612 and 614 in lane 604. The second platoon of vehicles 630 includes vehicles 616 and 618 now in lane 606. Accordingly, the second platoon of vehicles 630 is now split from the first platoon of vehicles 620, having entered into the space 644 secured by the unmanned aerial vehicles 640 and 642.

Figure 7A:
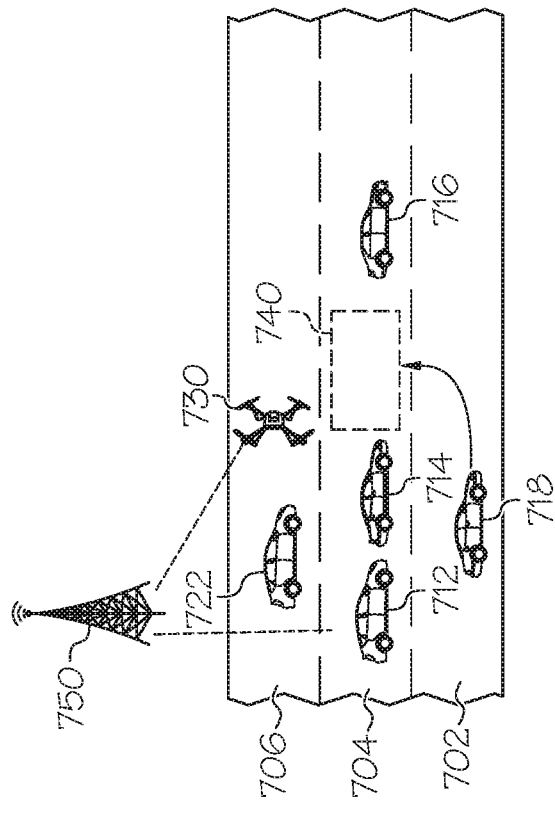
FIG. 7A depicts a system for assisting a merging of a platoon of vehicles, according to another embodiment shown and described herein.
Figure 7B:
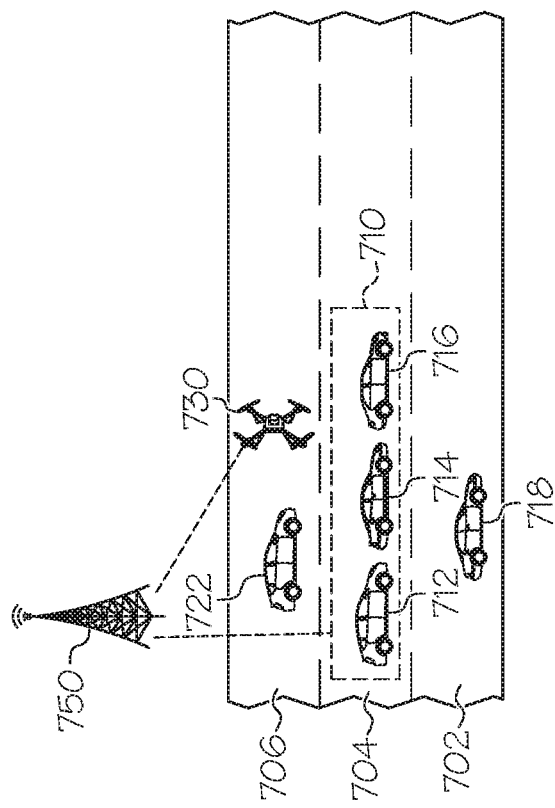
FIG. 7B depicts a system for assisting a merging of a platoon of vehicles, according to another embodiment shown and described herein.
Figure 7C:
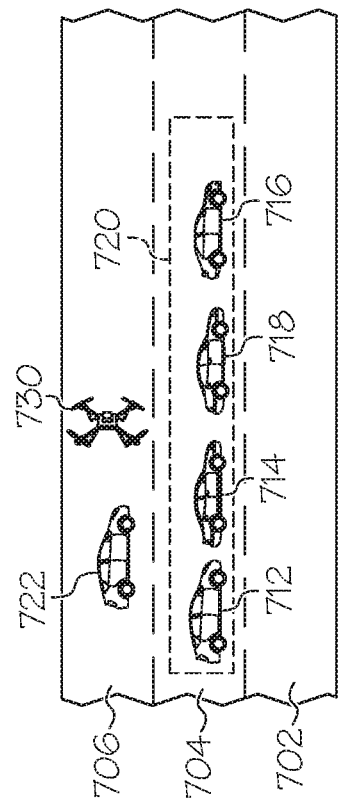
FIG. 7C depicts a system for assisting a merging of a platoon of vehicles, according to another embodiment shown and described herein.

FIGS. 7A through 7C depict a merging of a platoon of vehicles, according to one or more embodiments shown and described herein.

In FIG. 7A, a platoon of vehicles 710 is driving on a lane 704. The platoon of vehicles 710 includes vehicles 712, 714, 716. Each of the vehicles 712, 714, 716 may be either a connected vehicle or a non-connected vehicle. The platoon of vehicles 710 may need to receive an additional vehicle in the platoon. The platoon of vehicles 710 may transmit its location along with maneuver information to the server 750. In this example, the maneuver information includes a merging of the platoon of vehicles.

The server 750 may determine one or more unmanned aerial vehicles among a plurality of unmanned aerial vehicles based on a proximity of a maneuver location and the plurality of unmanned aerial vehicles. In this example, the sever 750 may determine the unmanned aerial vehicle 730 and dispatch the unmanned aerial vehicle 730 to the platoon of vehicles 710. The unmanned aerial vehicle 730 may fly proximate to the platoon of the vehicles 710 to prevent other vehicles from merging into the platoon of vehicles 710. For example, the unmanned aerial vehicle 730 flies over the lane 706 and secures a space 740 for receiving a vehicle 718 to be merged into the platoon of vehicles 710 as shown in FIG. 7B. The unmanned aerial vehicle 730 may output indications such that other vehicles may not enter into the space 740. In FIG. 7C, the vehicle 718 is merged into the platoon of vehicles 710 to constitute a new platoon of vehicles 720 while the unmanned aerial vehicle 730 prevents other vehicles such as the vehicle 722 from entering into the space 740.

Figure 8:
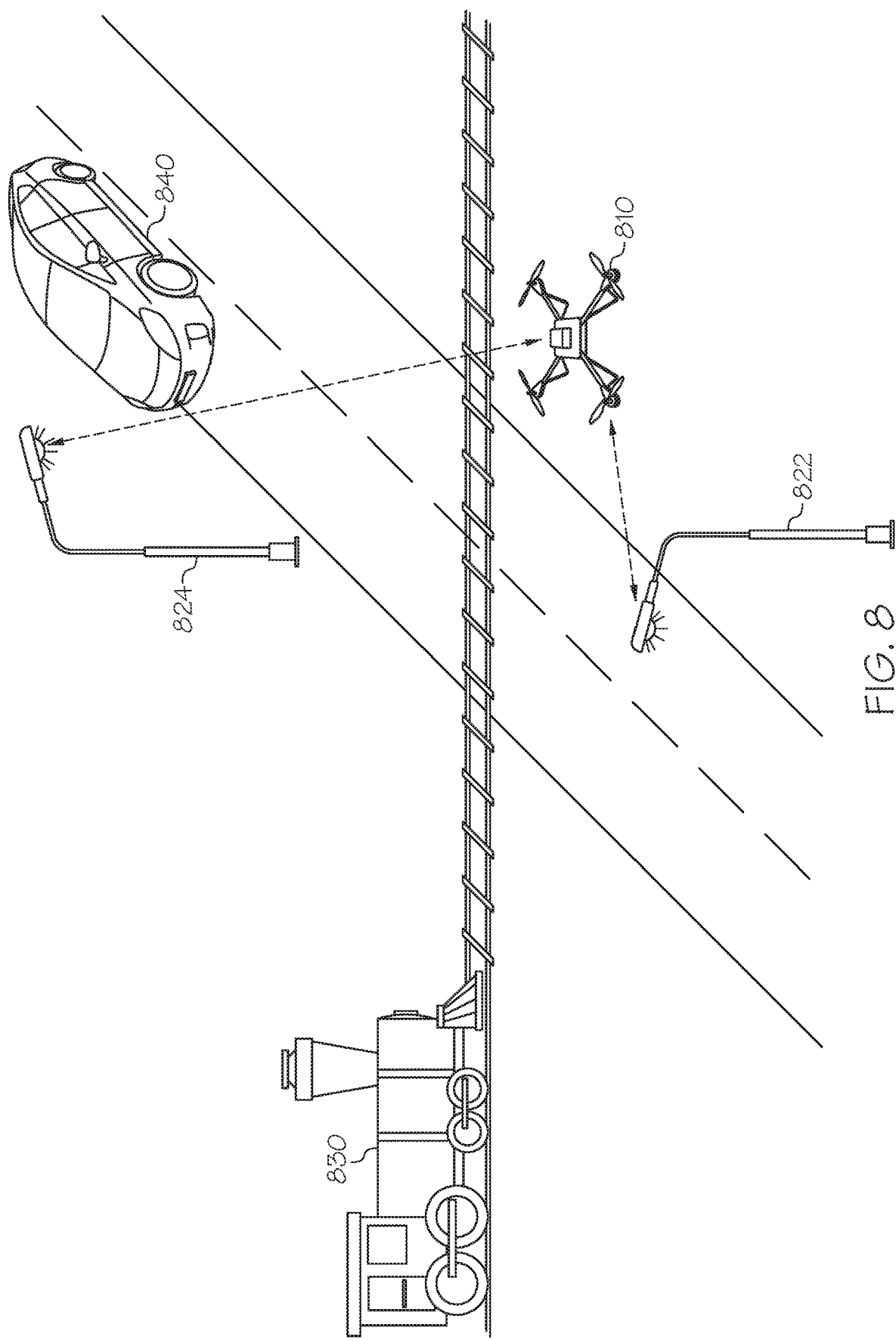
FIG. 8 depicts an unmanned aerial vehicle communicating with road lights, according to another embodiment shown and described herein.

FIG. 8 depicts an unmanned aerial vehicle communicating with road lights according to another embodiments shown and described herein. An unmanned aerial vehicle 810 may be dispatched to a location wherein a train 830 is approaching. A server may dispatch the unmanned aerial vehicle 810 to a railroad crossing when the train 830 is expected to arrive the railroad crossing within a certain period of time. The unmanned aerial vehicle 810 may wirelessly communicate with smart road lights such as smart road lights 822 and 824 and control the lightings of the smart road lights 822 and 824. For example, when the train 830 is about to arrive at the railroad crossing, the unmanned aerial vehicle 810 may instruct the smart road lights 822 and 824 to blink such that vehicles approaching the railroad crossing, such as a vehicle 840, may be alerted of the train approaching the railroad crossing.

Figure 9:
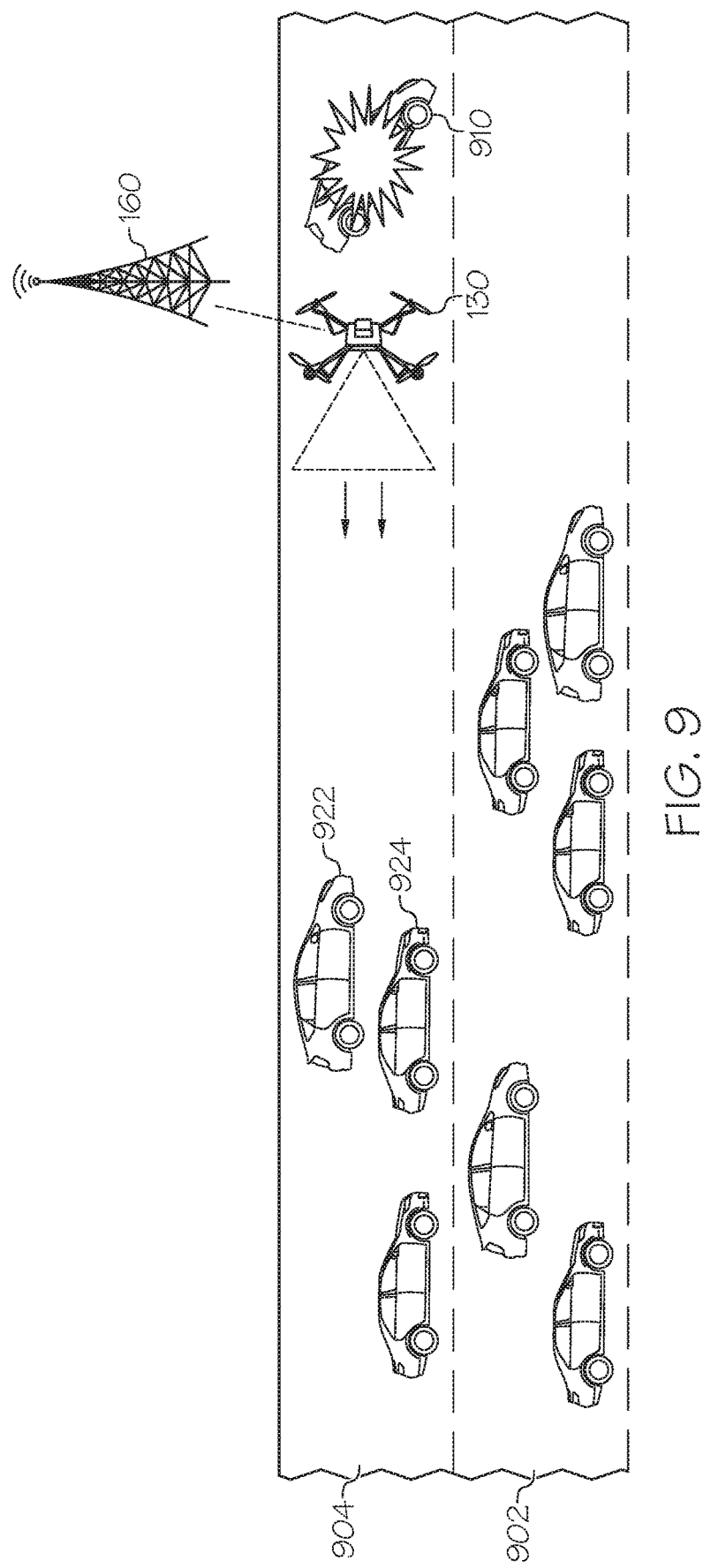
FIG. 9 depicts an unmanned aerial vehicle guiding vehicles approaching the location of a traffic accident, according to another embodiments shown and described herein.

FIG. 9 depicts an unmanned aerial vehicle guiding vehicles approaching the location of a traffic accident, according to another embodiment shown and described herein. The server 160 may receive the location of an accident 910. For example, a vehicle involved in the accident 910 or a vehicle proximate to the accident 910 may transmit the location of the accident 910 to the server 160 via vehicle-to-everything communication.

The server 160 may determine one or more unmanned aerial vehicles among a plurality of unmanned aerial vehicles based on a proximity of the location of the accident 910 and the plurality of unmanned aerial vehicles. In this example, the sever 160 may determine the unmanned aerial vehicle 130 and dispatch the unmanned aerial vehicle 130 to the location of the accident 910. The unmanned aerial vehicle 130 may fly proximate to the location of the accident 910 to guide vehicles to move around the accident 910. For example, the unmanned aerial vehicle 130 flies over the lane 904 in front of the location of the accident 910 and guide vehicles 922, 924 on the same lane as the accident 910 to change lanes from the lane 904 to a lane 902 as shown in FIG. 9. The unmanned aerial vehicle 130 may output a right arrow on its display device to guide the vehicles 922, 924 on the lane 904 to change to the right lane, i.e., the lane 902.

Figure 10:
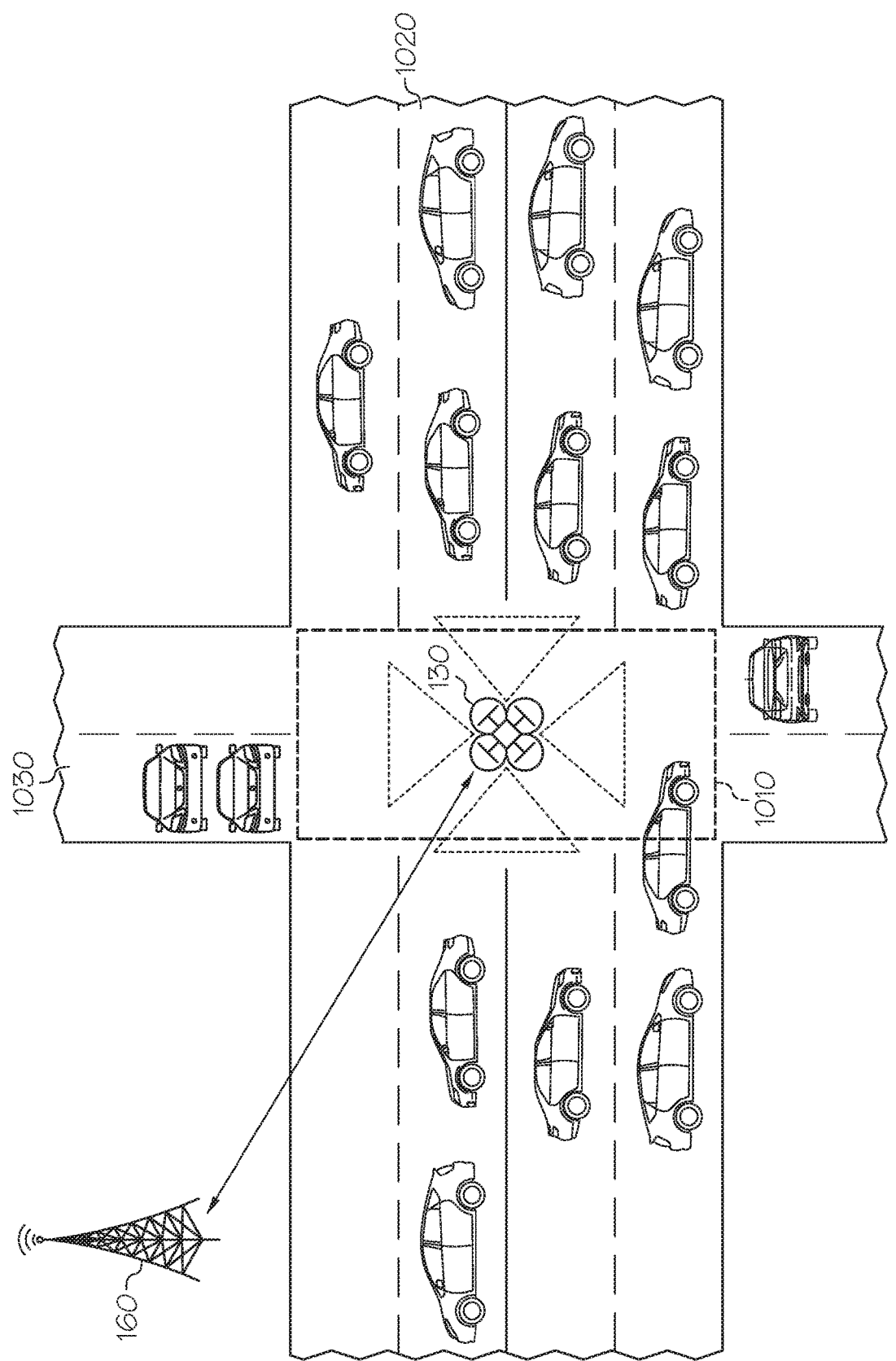
FIG. 10 depicts an unmanned aerial vehicle operating as a temporary traffic light, according to another embodiments shown and described herein.

FIG. 10 depicts an unmanned aerial vehicle operating as a temporary traffic light, according to another embodiments shown and described herein. The server 160 may receive a location of a crossroad 1010 where a traffic light is not present or is not working properly. For example, a vehicle proximate to the crossroad 1010 may determine whether there is a traffic light working properly at the crossroad 1010 and transmit the location of the crossroad 1010 to the server 160 via vehicle-to-everything communication in response to determination that there is no traffic light working properly.

The server 160 may determine one or more unmanned aerial vehicles among a plurality of unmanned aerial vehicles based on a proximity of the location of the crossroad 1010 and the plurality of unmanned aerial vehicles. In this example, the sever 160 may determine the unmanned aerial vehicle 130 is to proceed to the crossroad 1010 and dispatch the unmanned aerial vehicle 130 to the location of the crossroad 1010. The unmanned aerial vehicle 130 may fly over the crossroad 1010 to operate as a traffic light and guide vehicles to move across the crossroad 1010. For example, the unmanned aerial vehicle 130 flies over the crossroad 1010 and output traffic lights on the display device. Specifically, The unmanned aerial vehicle 130 may output red lights towards the vehicles on a road 1020 while outputting green lights towards the vehicles on a road 1030.

It should be understood that embodiments described herein are directed to methods and systems for assisting a maneuver of a moving object. A system for assisting a maneuver of a moving object includes a plurality of unmanned aerial vehicles, and a computing device comprising a controller configured to: identify a maneuver location of the moving object based on location information associated with the moving object; determine one or more unmanned aerial vehicles among the plurality of unmanned aerial vehicles based on a proximity of the maneuver location and the plurality of unmanned aerial vehicles; dispatch the one or more unmanned aerial vehicles to the maneuver location; and transmit an instruction signal to the one or more unmanned aerial vehicles, wherein the instruction signal causes the one or more unmanned aerial vehicles to generate an indication configured to assist one or more vehicles approaching the maneuver location.

The present disclosure addresses the maneuvering of large, long or interdependent entities by leveraging unmanned aerial vehicles as a new layer of public infrastructure. The system according to the present disclosure not only helps entities to perform maneuvers but also directs ongoing traffic around the maneuvers. The system computes the maneuver locations based on available information by using origin or destination and the route of entities. For example, the system may determine the location of a U-turn of an entity along the route of the entity. The system initiates drone-as-a-maneuver assistance before entities reach maneuver locations. The system explores nearby and available unmanned aerial vehicles and navigates the unmanned aerial vehicles to maneuver locations. The present system assists the entities with executing smooth maneuvers, and helps the driver to explore the blind spots of large or long entities. The system escorts vehicles on-demand and forewarns the neighboring traffic about potential risk by directing the traffic through lights output by unmanned aerial vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for assisting a maneuver of a moving object, the system comprising:
   a plurality of unmanned aerial vehicles; and
   a computing device comprising a controller configured to:
      identify a maneuver location of the moving object based on location information associated with the moving object;
      determine a number of lanes covered by a turning maneuver of the moving object at the maneuver location based on a planned route of the moving object and a length of the moving object;
      determine a number of unmanned aerial vehicles to be dispatched based on the number of lanes;
      dispatch the number of unmanned aerial vehicles to the maneuver location; and
      transmit an instruction signal to one or more of the number of unmanned aerial vehicles, wherein the instruction signal causes the one or more of the number of unmanned aerial vehicles to output a visual indication toward one or more vehicles,
      wherein the moving object is a platoon of interdependent vehicles, and the length of the moving object is a length of an entirety of the platoon.

2. The system of claim 1, wherein the controller is configured to:
   determine maneuver information about the moving object at the maneuver location based on information about the moving object; and
   determine the visual indication based on the maneuver information.

3. The system of claim 2, wherein the maneuver information about the moving object at the maneuver location includes one of a right turn, a left turn, a U turn, a backward movement, entering a road, exiting a road, and an entering movement.

4. The system of claim 2, wherein the controller is configured to:

determine the number of unmanned aerial vehicles also based on at least one of the maneuver information, a road geometry, and traffic density.

5. The system of claim 1, wherein a first unmanned aerial vehicle of the number of unmanned aerial vehicles includes:
imaging sensors configured to capture one or more images of the one or more vehicles approaching the maneuver location; and
another controller configured to determine feedback information based on the one or more images.

6. The system of claim 5, wherein the another controller of the first unmanned aerial vehicle is configured to:
process the one or more images of the one or more vehicles to determine whether movements of the one or more vehicles conform with the indication; and
determine the feedback information based on the determination whether the movements of the one or more vehicles conform with the indication.

7. The system of claim 6, wherein the feedback information includes one of a plurality of different colors, symbols, or shapes, or a blinking of the different colors, symbols, or shapes.

8. The system of claim 5, wherein the first unmanned aerial vehicle includes:
a display configured to output the feedback information, wherein the feedback information includes messages for lanes proximate the maneuver location.

9. The system of claim 8, wherein the another controller of the first unmanned aerial vehicle is configured to:
process the one or more images of the one or more vehicles to determine whether movements of the one or more vehicles on the lanes conform with the indication; and
determine the messages for the lanes based on the determination whether the movements of the one or more vehicles on the lanes conform with the indication.

10. The system of claim 1, wherein a first unmanned aerial vehicle of the number of unmanned aerial vehicles is communicatively coupled to one or more lights proximate to the maneuver location; and
the first unmanned aerial vehicle is configured to:
determine whether a maneuver of the moving object occurs at the maneuver location; and
instruct the one or more lights to output a notification in response to determining that the maneuver of the moving object occurs at the maneuver location.

11. The system of claim 1, wherein:
the one or more vehicles are non-connected vehicles, and
a first unmanned aerial vehicle of the number of unmanned aerial vehicles is configured to transmit a message related to a maneuvering of the moving object at the maneuver location to one or more connected vehicles proximate to the maneuver location.

12. A server for assisting a maneuver of a moving object, the server comprising:
a controller configured to:
identify a maneuver location of the moving object based on location information associated with the moving object;
determine a number of lanes covered by a turning maneuver of the moving object at the maneuver location based on a planned route of the moving object and a length of the moving object;
determine a number of unmanned aerial vehicles to be dispatched based on the number of lanes;
dispatch the number of unmanned aerial vehicles to the maneuver location; and
transmit an instruction signal to one or more of the number of unmanned aerial vehicles, wherein the instruction signal causes the one or more of the number of unmanned aerial vehicles to output a visual indication toward one or more vehicles,
wherein the moving object is a platoon of interdependent vehicles, and the length of the moving object is a length of an entirety of the platoon.

13. The server of claim 12, wherein the controller is configured to:
determine maneuver information about the moving object at the maneuver location based on information about the moving object; and
determine the visual indication based on the maneuver information.

14. The server of claim 13, wherein the controller is configured to:
determine the number of unmanned aerial vehicles also based on the maneuver information.

15. A method for assisting a maneuver of a moving object, the method comprising:
identifying a maneuver location of the moving object based on location information associated with the moving object;
determining a number of lanes covered by a turning maneuver of the moving object at the maneuver location based on a planned route of the moving object and a length of the moving object;
determining a number of unmanned aerial vehicles to be dispatched based on the number of lanes;
dispatching the number of unmanned aerial vehicles to the maneuver location; and
transmitting an instruction signal to the one or more of the number of unmanned aerial vehicles, wherein the instruction signal causes the one or more of the number of unmanned aerial vehicles to output a visual indication toward one or more vehicles,
wherein the moving object is a platoon of interdependent vehicles, and the length of the moving object is a length of an entirety of the platoon.

16. The method of claim 15, further comprising:
determining maneuver information about the moving object at the maneuver location based on information about the moving object; and
determining the visual indication based on the maneuver information.

17. The method of claim 16, further comprising:
determining the number of unmanned aerial vehicles also based on the maneuver information.

18. The system of claim 1, wherein the controller is configured to dispatch the number of unmanned aerial vehicles to the maneuver location before the moving object initiates the turning maneuver at the maneuver location.

19. The system of claim 1, wherein a moving direction of the moving object prior to arriving the maneuver location is different from a moving direction of the one or more vehicles.

20. The system of claim 1, wherein the moving object includes a chain of platoons where one platoon follows another platoon.

* * * * *